(12) United States Patent
Shiu et al.

(10) Patent No.: US 11,936,053 B2
(45) Date of Patent: Mar. 19, 2024

(54) FEEDTHROUGHS FOR THIN BATTERY CELLS

(71) Applicant: Apple Inc., Cupertino, CA (US)

(72) Inventors: Brian K. Shiu, Sunnyvale, CA (US); Christopher R. Pasma, Redwood City, CA (US); Andrew Meyers, Berkeley, CA (US); Haran Balaram, Sunnyvale, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 17/866,736

(22) Filed: Jul. 18, 2022

(65) Prior Publication Data

US 2022/0352582 A1 Nov. 3, 2022

Related U.S. Application Data

(62) Division of application No. 16/354,382, filed on Mar. 15, 2019, now Pat. No. 11,417,926.

(60) Provisional application No. 62/772,790, filed on Nov. 29, 2018.

(51) Int. Cl.
| | |
|---|---|
| *H01M 10/10* | (2006.01) |
| *H01M 50/105* | (2021.01) |
| *H01M 50/536* | (2021.01) |
| *H01M 50/553* | (2021.01) |
| *H01M 50/562* | (2021.01) |
| *H01M 50/593* | (2021.01) |

(52) U.S. Cl.
CPC ....... *H01M 50/105* (2021.01); *H01M 50/536* (2021.01); *H01M 50/553* (2021.01); *H01M 50/562* (2021.01); *H01M 50/593* (2021.01)

(58) Field of Classification Search
CPC ............ H01M 50/105; H01M 50/107; H01M 50/102; H01M 50/536; H01M 50/553; H01M 50/545; H01M 50/557; H01M 50/562; H01M 50/593
See application file for complete search history.

(56) References Cited

U.S. PATENT DOCUMENTS

| | | | |
|---|---|---|---|
| 4,350,747 A | 9/1982 | Alberto | |
| 4,358,514 A | 11/1982 | Garoutte et al. | |
| 4,559,283 A | 12/1985 | Kruger et al. | |
| 4,572,877 A | 2/1986 | Botos | |
| 5,004,656 A | 4/1991 | Sato et al. | |
| 8,043,738 B2 | 10/2011 | Suzuki et al. | |

(Continued)

FOREIGN PATENT DOCUMENTS

| | | |
|---|---|---|
| CA | 2755597 C | 1/2015 |
| CN | 101533899 A | 9/2009 |

(Continued)

*Primary Examiner* — Raymond Alejandro
(74) *Attorney, Agent, or Firm* — BakerHostetler

(57) ABSTRACT

The disclosed technology relates to electrical feedthroughs for thin battery cells. A battery cell enclosure includes a terraced portion having a reduced thickness relative to another portion of the enclosure. The enclosure includes an opening disposed on a horizontal surface of the terraced portion for receiving the electrical feedthrough. Because the feedthrough is disposed on the horizontal surface of the terraced portion, the feedthrough may be over-sized thereby reducing the resistance and impedance of the feedthrough without increasing the height or thickness of the enclosure.

8 Claims, 13 Drawing Sheets

(56) References Cited

U.S. PATENT DOCUMENTS

| | | |
|---|---|---|
| 9,118,087 B2 | 8/2015 | Abe et al. |
| 9,616,518 B2 | 4/2017 | Kroll et al. |
| 11,145,925 B2 * | 10/2021 | Shiu .................... H01M 50/191 |
| 2003/0017390 A1 | 1/2003 | Probst et al. |
| 2003/0096162 A1 | 5/2003 | Lasater et al. |
| 2004/0191621 A1 | 9/2004 | Heller |
| 2007/0090788 A1 | 4/2007 | Hansford et al. |
| 2007/0122697 A1 | 5/2007 | Wutz et al. |
| 2012/0160558 A1 | 6/2012 | Okamoto et al. |
| 2012/0202107 A1 | 8/2012 | Ito |
| 2015/0136840 A1 | 5/2015 | Zhao et al. |
| 2015/0140417 A1 * | 5/2015 | Matsumoto ......... H01M 50/169 |
| | | 429/179 |
| 2016/0315306 A1 | 10/2016 | Jang et al. |
| 2017/0092907 A1 | 3/2017 | Hyung et al. |
| 2017/0162838 A1 | 6/2017 | Revirand et al. |
| 2018/0026256 A1 | 1/2018 | Inoue et al. |
| 2018/0083312 A1 | 3/2018 | Shiu et al. |
| 2019/0341587 A1 | 11/2019 | Pasma et al. |
| 2020/0083498 A1 * | 3/2020 | Shiu .................... H01M 50/191 |
| 2020/0373548 A1 | 11/2020 | Kozuki |

FOREIGN PATENT DOCUMENTS

| | | |
|---|---|---|
| CN | 102197515 A | 9/2011 |
| CN | 102629672 A | 8/2012 |
| CN | 104781946 A | 7/2015 |
| CN | 105118954 A | 12/2015 |
| CN | 106413972 A | 2/2017 |
| EP | 1620907 B1 | 8/2007 |
| JP | 61-224263 S | 10/1986 |
| JP | 2008-192552 A | 8/2008 |
| WO | WO 2004/086538 A2 | 10/2004 |

\* cited by examiner ized, and welding an outer ring of the annular channel to the enclosure along a periphery of the opening. The method further includes welding a cathode tab extending from a cathode layer to the pin and welding an anode tab extending from an anode layer to the enclosure. The method also includes sealing the enclosure to hermetically seal the cathode and anode layers, and filling the enclosure with electrolyte.

FEEDTHROUGHS FOR THIN BATTERY CELLS

PRIORITY

This application is a divisional of U.S. patent application Ser. No. 16/354,382 filed Mar. 15, 2019 which claims the benefit under 35 U.S.C. § 119(e) of U.S. Provisional Patent Application Ser. No. 62/772,790, entitled "FEEDTHROUGHS FOR THIN BATTERY CELLS," filed on Nov. 29, 2018, which is incorporated herein by reference in its entirety.

TECHNICAL FIELD

The present disclosure relates generally to battery cell feedthroughs, and more particularly, to battery cell feedthroughs for use with thin battery cells.

BACKGROUND

Lithium-ion batteries are used in various portable electronic devices, including laptop computers, tablet computers, mobile phones, personal digital assistants (PDAs), digital music players, watches, and wearable devices.

One important aspect of lithium-ion batteries is the electrical feedthrough which enables electrical connection, through the battery enclosure, to the electrode stack. Electrical feedthroughs must insulate the electrical connection to the cathode from the enclosure to prevent shorting of the battery cells. Further, the enclosure enclosing the electrodes may be filled with electrolyte thereby requiring the electrical feedthrough to provide a hermetically seal.

SUMMARY

The disclosed embodiments provide for a battery cell feedthrough for use in thin battery cells. The feedthrough is provided at a terraced region of an enclosure, where the terraced portion has a reduced thickness relative to other portions of the enclosure. The enclosure encloses a set of layers that include a cathode layer, an anode layer, and a separator layer disposed between the cathode layer and the anode layer. The feedthrough may include an annular channel, an insulator, and a pin. The annular channel may have an outer ring, an inner sidewall, and a base. The insulator may be formed of glass and may be bonded to the inner sidewall of the annular channel. The pin may extend through the insulator and may be electrically coupled to a tab extending from the set of layers to form an external battery terminal at the pin.

In some embodiments, a method for manufacturing a battery cell is disclosed. The method includes insulating a pin within an annular channel using glass, sliding the annular channel within an opening disposed on a terraced portion of an enclosure, and welding an outer ring of the annular channel to the enclosure along a periphery of the opening. The method further includes welding a cathode tab extending from a cathode layer to the pin and welding an anode tab extending from an anode layer to the enclosure. The method also includes sealing the enclosure to hermetically seal the cathode and anode layers, and filling the enclosure with electrolyte.

BRIEF DESCRIPTION OF THE DRAWINGS

The embodiments herein may be better understood by referring to the following description in conjunction with the accompanying drawings in which like reference numerals indicate identical or functionally similar elements. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Rechargeable batteries for portable electronic devices often include cells that are made of alternating layers of anode and cathode electrodes, with a separator disposed there-between. The layers may be packaged in an enclosure and may utilize an electrical feedthrough to make an electrical connection to cathode electrodes through the enclosure. The enclosure enclosing the electrodes may be filled with electrolyte thereby requiring the enclosure to be hermetically sealed to prevent unwanted leakage or failure. In addition, electrical feedthroughs must insulate the electrical connection to the cathode electrodes from the enclosure to prevent shorting of the battery cells.

Conventionally, feedthroughs may pass through a sidewall, side, or vertical surface of a battery enclosure. Because electrical feedthroughs may require a minimum cross-sectional area to maintain an acceptable level of resistance or impedance, electrical feedthroughs are limited to a certain dimension. As such, a height of a sidewall or thickness of a battery enclosure cannot be reduced beyond the minimal dimension required for the feedthrough. Accordingly, there is a need for certain embodiments of an electrical feedthrough that may be used for thin battery enclosures, such as battery enclosures having a height or thickness of less than 2 mm.

The disclosed technology addresses the foregoing limitations of conventional feedthroughs for battery enclosures by positioning a feedthrough at a horizontal surface, as opposed to a vertical surface, and by incorporating a terraced portion on the battery enclosure for receiving the electrical feedthrough. Because the electrical feedthrough is located at the terraced portion with ample physical space for accommodating the feedthrough, the battery cell may have increased performance through use of an over-sized feedthrough, with reduced resistance or impedance, and increased packaging efficiency.

Figure 1:
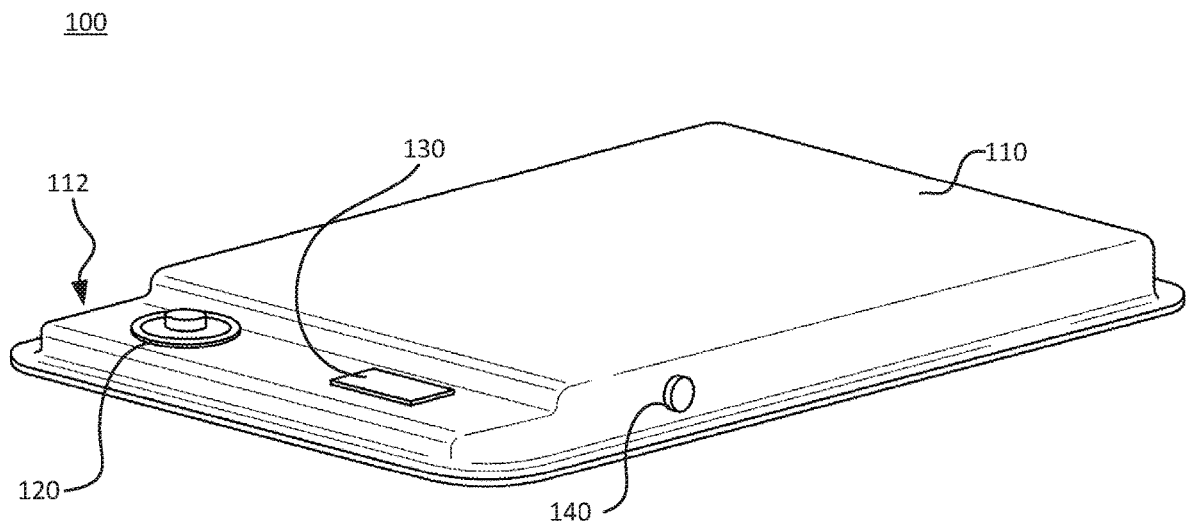
FIG. 1 illustrates a perspective view of an assembled battery, in accordance with various aspects of the subject technology.

FIG. 1 illustrates a perspective view of an assembled battery 100, in accordance with various aspects of the subject technology. The battery 100 comprises an enclosure 110, a feedthrough 120, a terminal 130 and port 140. The enclosure 110 may comprise a terraced portion 112 having a reduced thickness relative to another portion or remainder of the enclosure 110. For example, the enclosure 110 may have an overall thickness of less than 3 mm, or more specifically, less than about 2 mm, 1.9 mm, 1.8 mm, 1.7 mm, 1.6 mm, or 1.5 mm, and the terraced portion 112 may have a thickness that is lesser than the overall thickness of the other portions of the enclosure 110. For example, if the enclosure 110 has an overall thickness of 3 mm, the terraced portion may have a thickness of 1.5 mm. The feedthrough 120 and the terminal 130 may be disposed at the terraced portion 112. For example, the feedthrough 120 may pass through an opening disposed at the terraced portion and the terminal 130 may be directly welded onto the terraced portion.

The enclosure may be formed of metal, such as aluminum or an aluminum alloy, and may have a non-corrosive coating line the interior of the enclosure 110. The enclosure 110 is configured to enclose and hermetically seal one or more cells disposed within the enclosure. In one aspect, the enclosure 110 may comprise a top portion and a bottom portion. The top portion includes the terraced portion 112 and may comprise a cup or open cube, cuboid, cylinder, prism, cone, pyramid or combination thereof, configured to receive the one or more battery cells. The bottom portion may be configured to completely enclose and seal the one or more battery cells, and may be bonded, glued, welded, mechanically fastened or coupled, to the top portion along a periphery. For example, the top portion and bottom portion of the enclosure 110 may be welded together at the periphery by welding together flanges on the top portion and the bottom portion, respectively. In another example, the top portion and bottom portion of the enclosure 110 may be welded together at a periphery by welding together a joggled overlap between the top portion and the bottom portion. In yet another example, the top portion and bottom portion of the enclosure 110 may be welded together at a periphery by welding together an overlap between the top portion and the bottom portion.

Each battery cell may comprise at least one set of layers formed of at least one cathode layer with an active coating, a separator, and at least one anode layer with an active coating, as discussed with reference to FIG. 10. A tab may extend from each of the anode and cathode layers, as discussed further below. The terminal 130 may comprise a weld pad that is configured to be electrically connected or coupled to a tab extending from the anode layer. The port 140 may comprise an opening on the enclosure 110 for receiving electrolyte. After the enclosure 110 is sufficiently filled with electrolyte, the port 140 may be welded or sealed shut to prevent leakage of the electrolyte.

Figure 2:
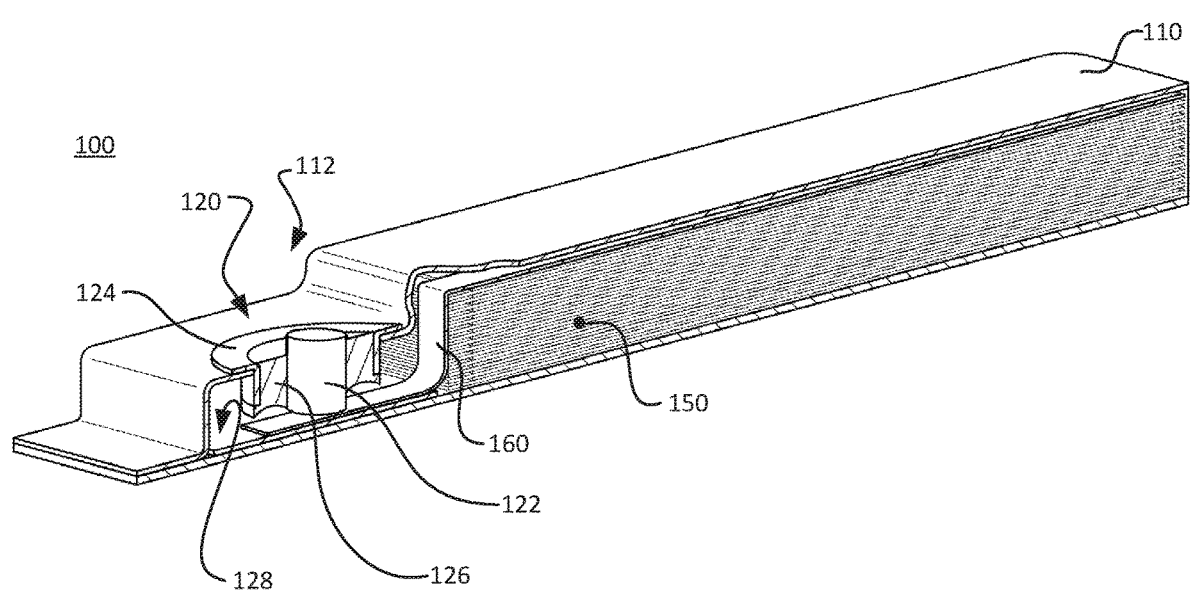
FIG. 2 illustrates a perspective cross-section view of an assembled battery, in accordance with various aspects of the subject technology.

FIG. 2 illustrates a perspective cross-section view of the assembled battery 100, in accordance with various aspects of the subject technology. In one aspect, the feedthrough 120 may comprise a pin 122, an annular channel 124, and an insulator 126. The feedthrough 120 seals the set of layers 150 within the enclosure 110 and provides an electrical connection to the anode or cathode layer of the set of layers 150 via the pin 122. The feedthrough 120 may be disposed at the terraced portion 112 through an opening and bonded, glued, welded, or coupled, to the terraced portion 112 of the enclosure 110.

The annular channel 124 of the feedthrough 120 comprises an outer ring, an inner sidewall, and a base. The outer ring of the annular channel 124 contacts an outer surface of the terraced portion 112 of the enclosure 110, and after a bonding, gluing, welding, or coupling operation, creates a hermetic seal between the feedthrough 120 and the enclosure 110. For example, the annular channel 124 may be welded to the opening of the terraced portion 112 along a periphery by welding the outer ring of the annular channel 124 to the outer surface of the terraced portion 112 of the enclosure 110. The annular channel 124 may be formed of a rigid material, and may further be made of a material that is adequate for welding to the enclosure 110. For example, if the enclosure 110 is formed of a stainless steel material, the annular channel 124 may also be formed of a stainless steel material to enable welding of the annular channel 124 and enclosure 110.

The insulator 126 is formed of an electrically insulating material, such as glass or a ceramic and prevents electrical contact between the pin 122 and the enclosure 110. The pin 122 extends through the insulator 126 and is electrically coupled to a tab 160 extending from the set of layers to form an external battery terminal at the pin 122. The pin may be formed of a metal or alloy, or material that is capable of conducting electricity, such as molybdenum. In one aspect, the pin 122 may be spot welded, laser welded, or ultra-sonic welded to a tab 160 extending from the cathode or anode of the set of layers 150. When coupled to the tab 160 extending from the set of layers 150, electrical energy from the cathode or anode, for example, passes through the tab 160 and to the pin 122, to thereby provide an external terminal for the battery 100.

The battery 100 may also include an insulating tape 128 disposed on an inner surface of the enclosure 110 and proximate to the tab 160 to prevent electrical contact between the tab 160 and the inner surface of the enclosure 110. The insulating tape 128 may have an adhesive on a surface that is in contact with the inner surface of the enclosure 110, such as pressure sensitive adhesive.

Figure 3A:
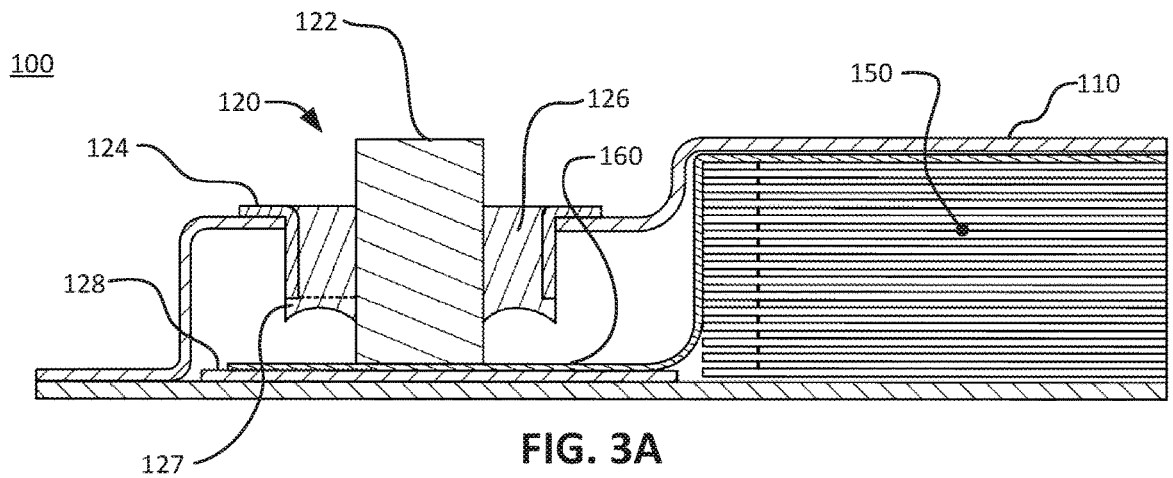
FIG. 3A illustrates a partial-section view of a feedthrough, in accordance with various aspects of the subject technology.

FIG. 3A illustrates a partial-section view of the feedthrough 120 utilizing an overmold portion 127, in accordance with various aspects of the subject technology. In one aspect, the insulator 126 may further comprise the overmold portion 127 to prevent inadvertent electrical contact between the annular channel 124 and the tab 160. The insulator 126 may be bonded to the inner sidewall of the annular channel 124 and the base of the annular channel 124. The insulator 126 is also bonded to the pin 122 and surrounds the pin 122. The overmold portion 127 of the insulator 126 extends between the base of the annular channel 124 and the tab 160, thereby preventing electrical contact between the tab 160 and the annular channel 124.

Figure 3B:
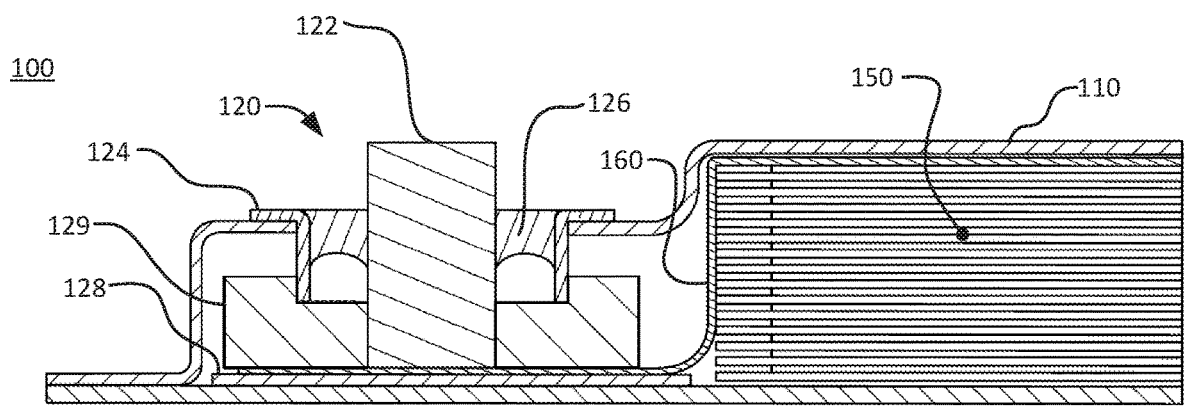
FIG. 3B illustrates a partial-section view of a feedthrough, in accordance with various aspects of the subject technology.

FIG. 3B illustrates a partial-section view of the feedthrough 120 utilizing a dielectric spacer 129, in accordance with various aspects of the subject technology. In other aspects, the feedthrough 120 may further comprise the dielectric spacer 129 disposed between the base of the annular channel 124 and the tab 160. The dielectric spacer 129 is configured to prevent electrical contact between the tab 160 and the annular channel 124. The dielectric spacer 129 may comprise a ring with a recessed center region for receiving the base of the annular channel 124.

Figure 3C:
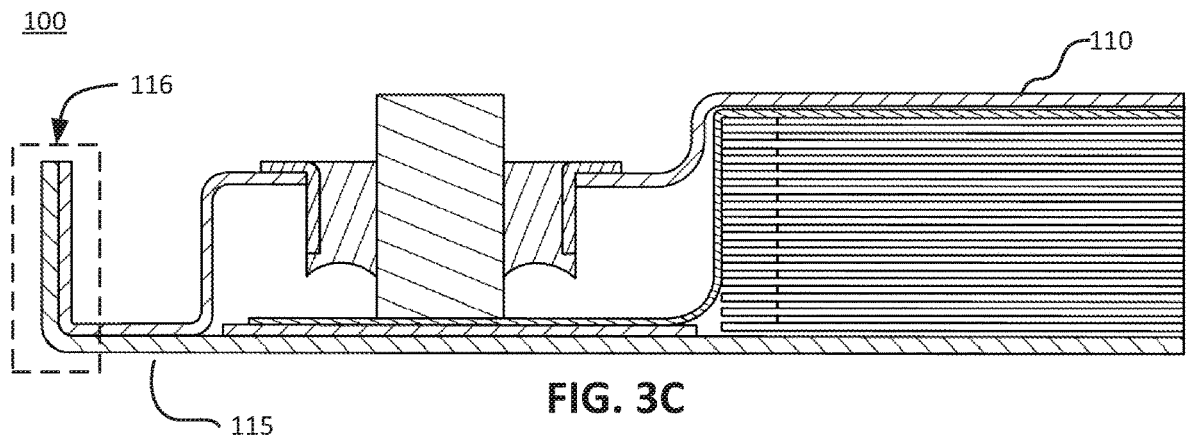
FIG. 3C illustrates a partial-section view of a flange of an enclosure, in accordance with various aspects of the subject technology.

FIG. 3C illustrates a partial-section view of a flange 115 of the enclosure 110, in accordance with various aspects of the subject technology. As described above, the top portion and bottom portion of the enclosure 110 may overlap and may be welded together at the periphery of the enclosure 110 to form a flange 115. In one aspect, the flange 115 may further comprise a lip 116 extending vertically from the flange 115 to stiffen the enclosure 110 by increasing an area moment of inertia for the enclosure. The lip 116 may extend along the entire periphery of the enclosure 110, or a portion thereof.

In some aspects, because the feedthrough 120 is disposed on a horizontal surface of the terraced portion 112, as opposed to a vertical sidewall of the enclosure 110, the pin 122 may have a sufficiently large cross-sectional area to ensure that the pin 122 does not throttle or create a bottleneck of the circuit, thereby maintaining the performance of the battery 100, regardless of the thickness of the enclosure 110. In other aspects, by disposing the feedthrough 120 onto the horizontal surface of the terraced portion 112, the pin 122 may be over-sized when compared to conventional feedthroughs, thus increasing the cross-sectional area of the pin 122 and thereby lowering an impedance of the feedthrough 120 by allowing more current to pass through the pin 122. In another aspect, by disposing the feedthrough 120 onto the horizontal surface of the terraced portion 112, welding of the annular channel 124 onto the terraced portion 112 becomes easier due to the larger area provided on the terraced portion 112 for welding. In yet another aspect, by disposing the feedthrough 120 onto the horizontal surface of the terraced portion 112, the dimension of the insulator 126 may be increased radially over conventional feedthroughs, to increase the performance of the insulator 126.

Figure 4:
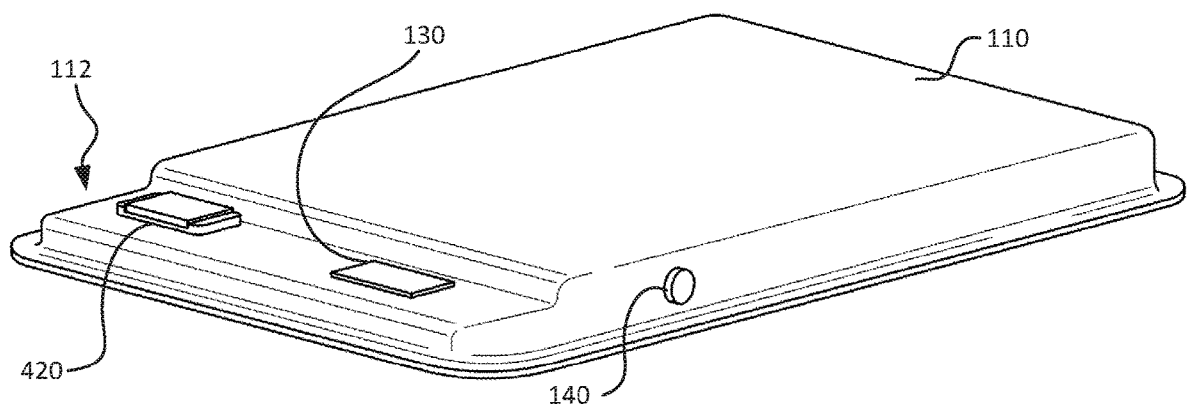
FIG. 4 illustrates a perspective view of an assembled battery, in accordance with various aspects of the subject technology.

FIG. 4 illustrates a perspective view of an assembled battery 400, in accordance with various aspects of the subject technology. The battery 400 comprises the enclosure 110, a feedthrough 420, the terminal 130 and the port 140. The enclosure 110 may comprise the terraced portion 112 having a reduced thickness relative to another portion or remainder of the enclosure 110, as described above. The feedthrough 420 and the terminal 130 may be disposed at the terraced portion 112. For example, the feedthrough 420 may pass through an opening 412 (as shown in FIGS. 5A-5B) disposed at the terraced portion 112 and the terminal 130 may be directly welded onto the terraced portion 112.

Figure 5A:
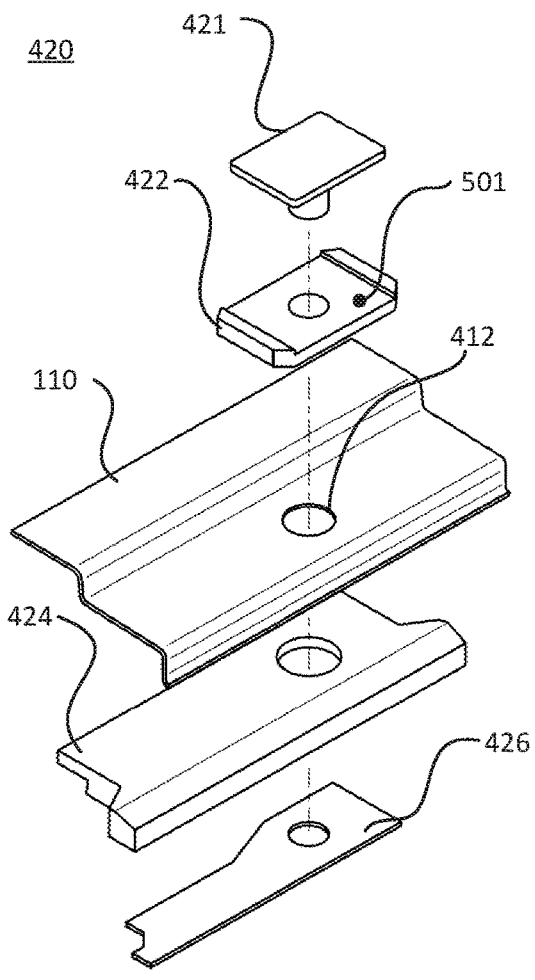
FIG. 5A illustrates an exploded view of a feedthrough, in accordance with various aspects of the subject technology.
Figure 5B:
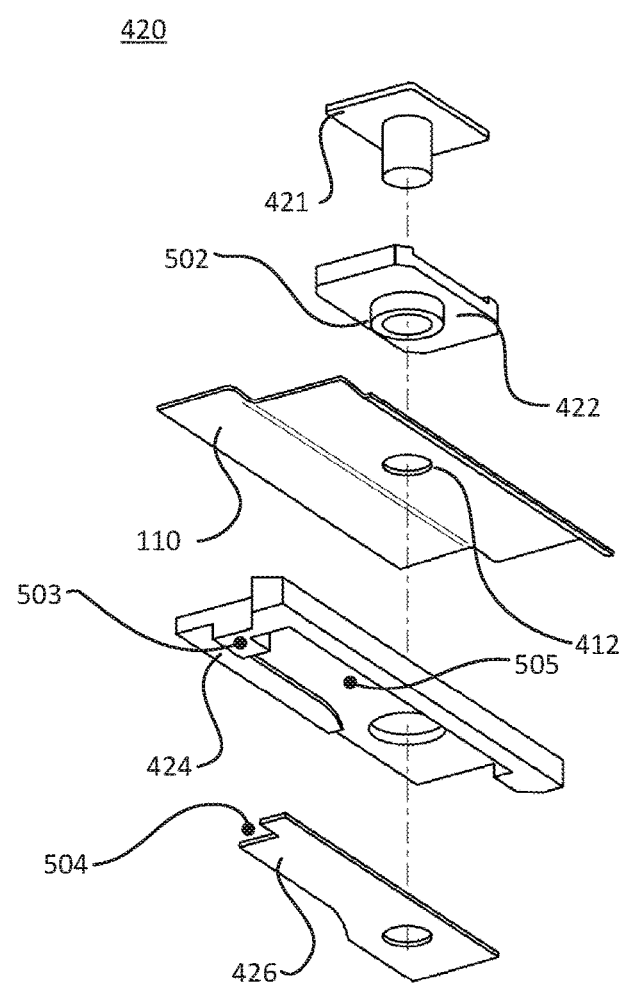
FIG. 5B illustrates an alternative exploded view of a feedthrough, in accordance with various aspects of the subject technology.

FIGS. 5A and 5B illustrate exploded views of the feedthrough 420, in accordance with various aspects of the subject technology. The feedthrough 420 may comprise a rivet 421, an outer gasket 422, an inner gasket 424, and a terminal 426. The rivet 421 is configured to compress the outer gasket 422, inner gasket 424, and terminal 426 to create a seal at an opening 412 on a wall of the enclosure 110. The feedthrough 420 does not require welding to the enclosure because it utilizes a compression force generated by the rivet 421 to create a hermetic seal at the opening 412. The feedthrough 420 may implement a multitude of anti-rotation features to reduce and mitigate the risk that an electrical short may occur between the feedthrough 420 and the enclosure 110, as the enclosure 110 may have an anode potential and the feedthrough 420 may have a cathode potential. By mitigating or eliminating the risk of an electrical shortage, reliability of the battery 400 is greatly improved.

Figure 6:
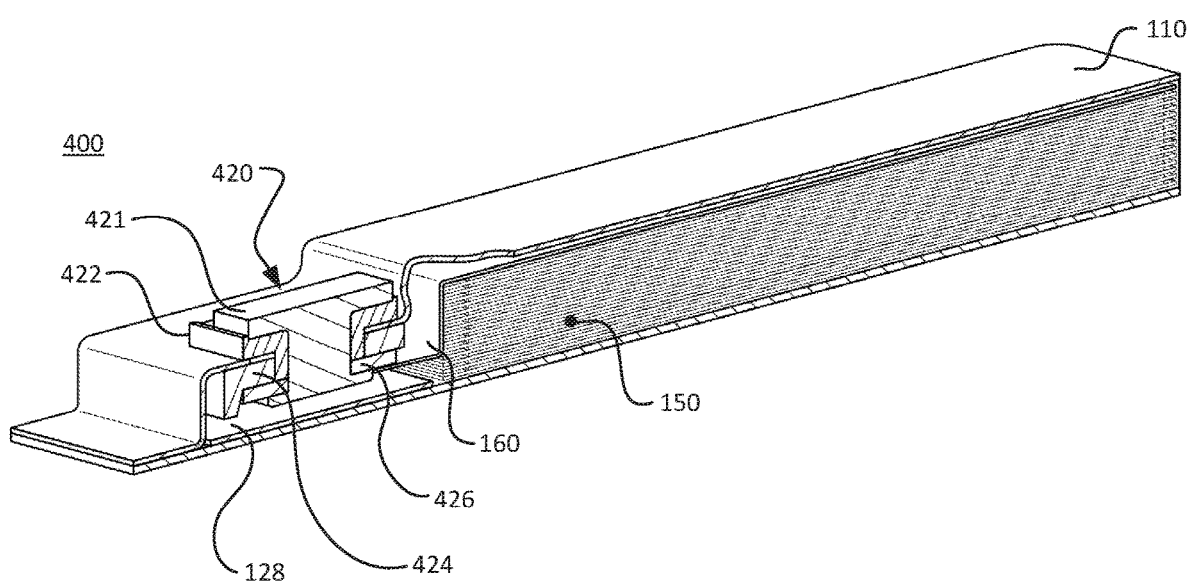
FIG. 6 illustrates a perspective cross-section view of an assembled battery, in accordance with various aspects of the subject technology.
Figure 7:
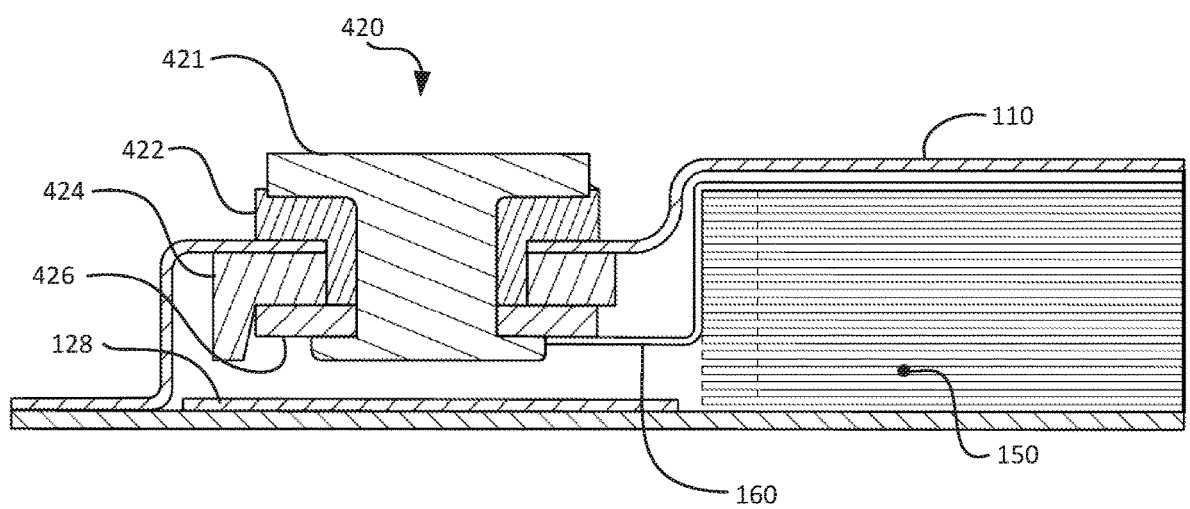
FIG. 7 illustrates a partial-section view of a feedthrough, in accordance with various aspects of the subject technology.

The rivet 421 may comprise a planar head at a first end, a shank extending therefrom, and a deformable tail at an opposite end. Prior to installation, the deformable tail may have a diameter that is substantially equal to or less than a diameter of the shank extending from the planar head (as shown in FIGS. 5A and 5B). The deformable tail of the rivet 421 is configured to expand in diameter after the rivet 421 is installed (as shown in FIGS. 6 and 7), to thereby compress the components sandwiched between the planar head and the deformable tail. In one aspect, the compression force generated by the rivet 421 is sufficient to create a hermetic seal at the opening 412, as well as prevent undesired rotation of the rivet 421 within the opening 412, inner gasket 424 within the enclosure 110, and/or terminal 426. The compression force generated by the rivet 421 may, for example, cause a compression stress of approximately 10-40 MPa acting on the outer gasket 422 and inner gasket 424. The rivet 421 may comprise a metal or alloy that is readily deformable, such as an aluminum alloy.

The outer gasket 422 may be disposed adjacent to the planar head of the rivet 421. The outer gasket 422 may comprise a recessed area 501 disposed at a proximal end of the outer gasket 422, an opening for receiving the shank of the rivet 421, and a collar 502 disposed at a distal end of the outer gasket 422 surrounding a portion of the opening. The recessed area 501 may be sized to accommodate a portion of the planar head of the rivet 421. The outer gasket 422 may comprise a polymer, such as perfluoroalkoxy (PFA), or other material capable of insulating electrical energy. In one aspect, the outer gasket 422 surrounds the rivet 421 to electrically insulate the rivet 421 from the enclosure 110.

The inner gasket 424 may be disposed on the collar 502 of the outer gasket 422. The inner gasket 424 may comprise an opening for receiving the collar of the outer gasket 422, a protrusion 503 for engaging a corresponding notch 504 on the terminal 426 to prevent rotation of the terminal 426 with respect to the inner gasket 424, and a recessed portion 505 for seating of the terminal 426 to prevent rotation of the terminal 426 with respect to the inner gasket 424. The inner gasket 424 may comprise a polymer, such as a pigmented polymer, and may, for example, comprise PFA, or other material capable of insulating electrical energy. In one aspect, the inner gasket 424 electrically insulates the terminal 426 from the enclosure 110.

In one aspect, the protrusion 503 may comprise a step or ledge that is configured to engage a corresponding edge or surface of the terminal 426 to prevent rotation of the terminal 426 with respect to the inner gasket 424. For example, the step or ledge of the protrusion 503 may mechanically engage and interfere with the edge or surface of the terminal 426 to prevent inadvertently movement or rotation of the terminal 426 about a center axis of the rivet 421, thereby preventing contact or shorting with an inside surface of the enclosure 110.

In another aspect, the recessed portion 505 may completely or partially surround the terminal 426 to further prevent rotation of the terminal 426 with respect to the inner gasket 424. For example, the recessed portion 505 may comprise a recessed area surrounded by at least one side wall of the inner gasket 424. The side wall prevents one or more edges of the terminal 426 from moving or rotating independently from the inner gasket 424 because the side wall surrounding the recessed area mechanically engages and prevents the terminal 426 from inadvertently moving or rotating about a center axis of the rivet 421, thereby preventing contact or shorting with an inside surface of the enclosure 110. In one aspect, the side wall may have a drafted profile, as shown in FIG. 7.

The terminal 426 may be disposed within the recessed portion 505 of the inner gasket 424. The terminal 426 may include a notch 504 for engaging the protrusion 503 of the inner gasket 424, and an opening for receiving the shank of the rivet 421. The terminal 426 may comprise a coupling region for electrically coupling to a tab 160 (show in FIGS. 6 and 7) extending from the set of layers 150 enclosed within the enclosure 110. The tab 160 extending from the set of layers 150 may, for example, be spot welded to the coupling region. The terminal 426 may comprise a metal or alloy, or material that is capable of conducting electricity. When coupled to the tab 160 extending from the set of layers 150, electrical energy from the cathode electrodes, for example, passes through the terminal 426 to the rivet 421 to thereby provide an external terminal for the battery cell at the planar head of the rivet 421.

Referring to FIGS. 6 and 7, cross-section views of the assembled battery 400 and feedthrough 420 are provided, in accordance with various aspects of the subject technology. The feedthrough 420 seals the set of layers 150 within the enclosure 110 and provides an electrical connection to the anode or cathode layer of the set of layers 150 via the rivet 421. The terminal 426 is seated within the recess portion of the inner gasket 424. The inner gasket 424 is disposed within the enclosure 110 and surrounds the collar of the outer gasket 422. The rivet 421 is shown in a deployed configuration with the deformable tail expanded, thereby compressing the terminal 426, inner gasket 424, outer gasket 422, and terraced portion of the enclosure 110 to create a hermetic seal at the opening of the terraced portion.

The battery 400 may also include an insulating tape 128 disposed on an inner surface of the enclosure 110 and proximate to the deformable end of the rivet 421 to prevent electrical contact between the rivet 421 and the inner surface of the enclosure 110. The insulating tape 128 may have an adhesive on a surface that is in contact with the inner surface of the enclosure 110, such as pressure sensitive adhesive.

In some aspects, because the feedthrough 420 is disposed on a horizontal surface of the terraced portion 112, as opposed to a vertical sidewall of the enclosure 110, the rivet 421 may have a sufficiently large cross-sectional area to ensure that the shank of the rivet 421 does not throttle or create a bottleneck of the circuit, thereby maintaining the performance of the battery 400, regardless of the thickness of the enclosure 110. The rivet 421 may be over-sized when compared to conventional feedthroughs, thus increasing the cross-sectional area of the rivet 421 and thereby lowering an impedance of the feedthrough 420 by allowing more current to pass through the rivet 421. In another aspect, by oversizing the rivet 421, the compressive force of the rivet 421 is substantially increased thereby improving the mechanical integrity of the feedthrough 420, as well as the integrity of the hermetic seal generated by the feedthrough 420.

Figure 8:
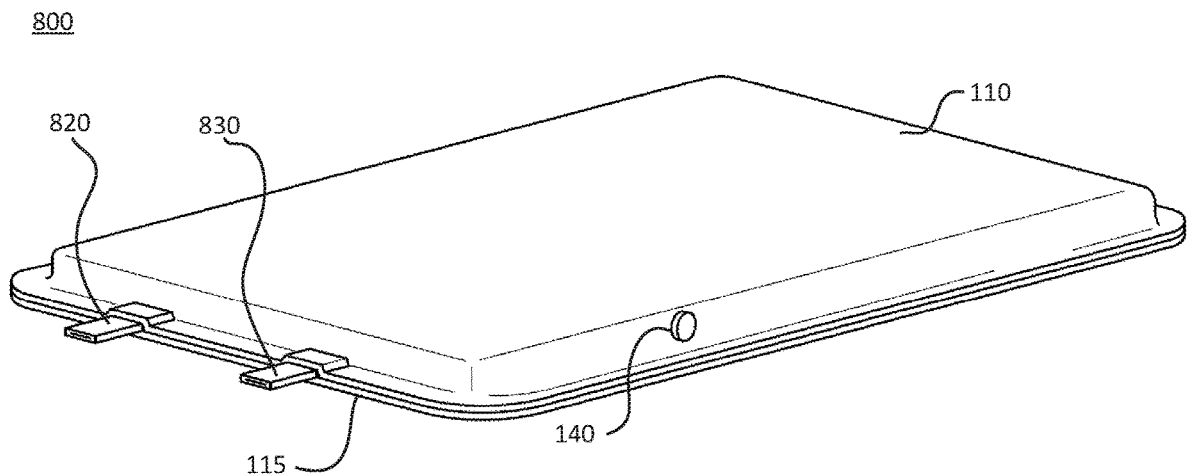
FIG. 8 illustrates a perspective view of an assembled battery, in accordance with various aspects of the subject technology.

FIG. 8 illustrates a perspective view of an assembled battery 800, in accordance with various aspects of the subject technology. The battery 800 comprises the enclosure 110, a first feedthrough 820, a second feedthrough 830, and the port 140. The first and second feedthroughs 820, 830 may comprise tabs extending directly from the set of layers 150 enclosed within the enclosure 110. The tabs of the first and second feedthroughs 820, 830 may surrounded by a layer of insulation that prevents electrical contact between the tabs and the enclosure 110. The insulation may comprise a heat-activated sealing material, such as polypropylene, copolymers of ethylene and acrylic acid, polyamide resins, polyester resins, ionomers, poly urethane resins, polyethylene resin (high as well as low density), nutrient cellophane, actate films, hard and soft vinyl chloride film, polyvinylidene chloride film, polystyrene film, polycarbonate film, nylon film, or polyethylene cellophane. To surround each of the tabs extending from the set of layers 150, the insulation may be applied to each tab in liquid or gel form and set or cured thereafter.

In one aspect, the top or bottom portion of the enclosure may include a relief for each of the feedthroughs 820, 830 that allows the feedthroughs 820, 830 to extend through the flange 115 of the enclosure 110 without damaging or crimping the tabs of the feedthroughs 820, 830. The relief may comprise an indentation at the flange 115 that is sized to accommodate the tabs of the feedthroughs 820, 830. In one aspect, to create a hermetic seal at the feedthroughs 820, 830, the insulation may be heated so that the insulation bonds directly to the flange 115 using a hot plate, or via impulse bonding, ultra-sonic bonding, high frequency bonding, or hot air bonding.

In one aspect, the top portion and/or bottom portion of the enclosure 110 may be lined with a heat-activated sealing material at the flange 115. Bonding of the top portion of the enclosure 110 with the bottom portion of the enclosure 110 may generate a hermetic seal along the flange 115 and at the feedthroughs 820, 830. To obtain an adequate seal at the flange 115, the flange may have a minimal width of 2 mm.

In some aspects, by simplifying the feedthrough 820, 830, additional components associated with conventional feedthroughs may be eliminated thereby reducing the likelihood of failure, increasing reliability, while also reducing costs.

Figure 9A:
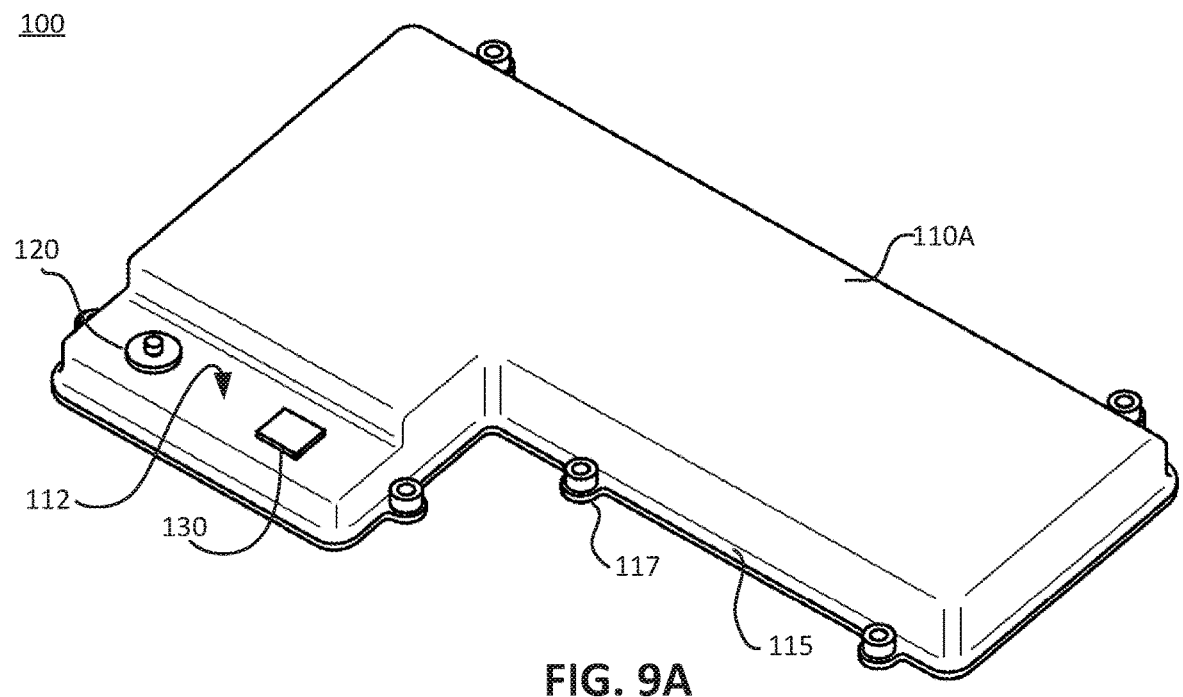
FIG. 9A illustrates a perspective view of an assembled battery, in accordance with various aspects of the subject technology.
Figure 9B:
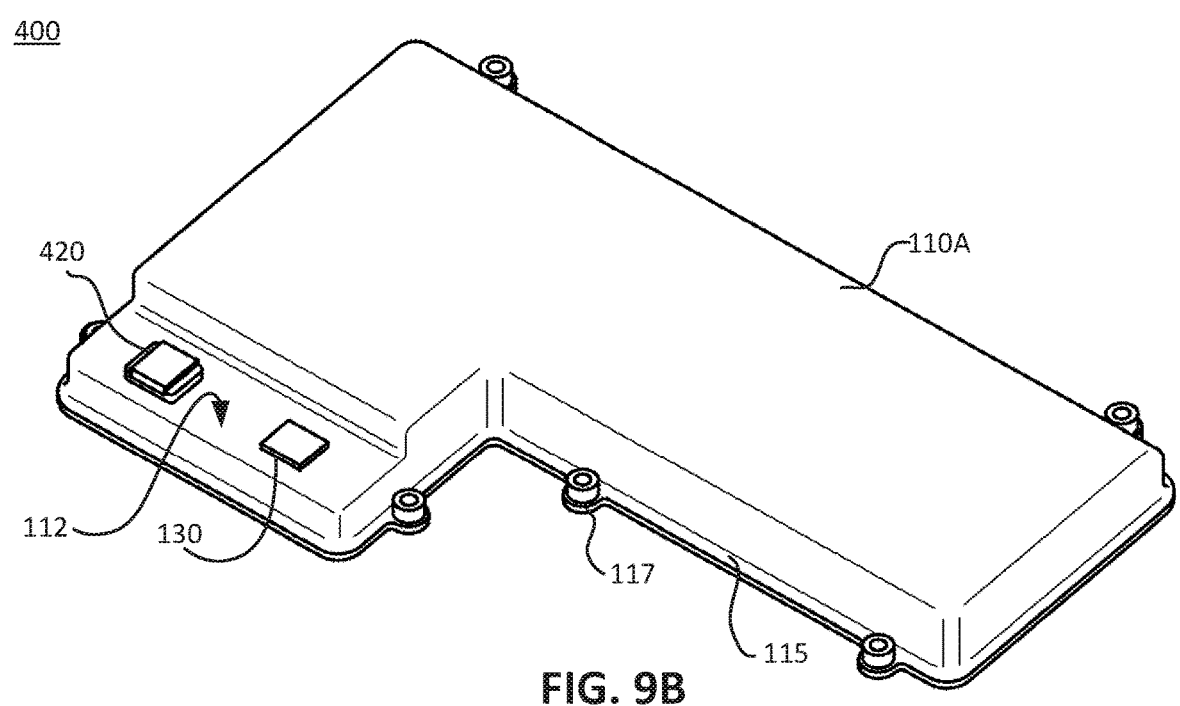
FIG. 9B illustrates a perspective view of an assembled battery, in accordance with various aspects of the subject technology.
Figure 9C:
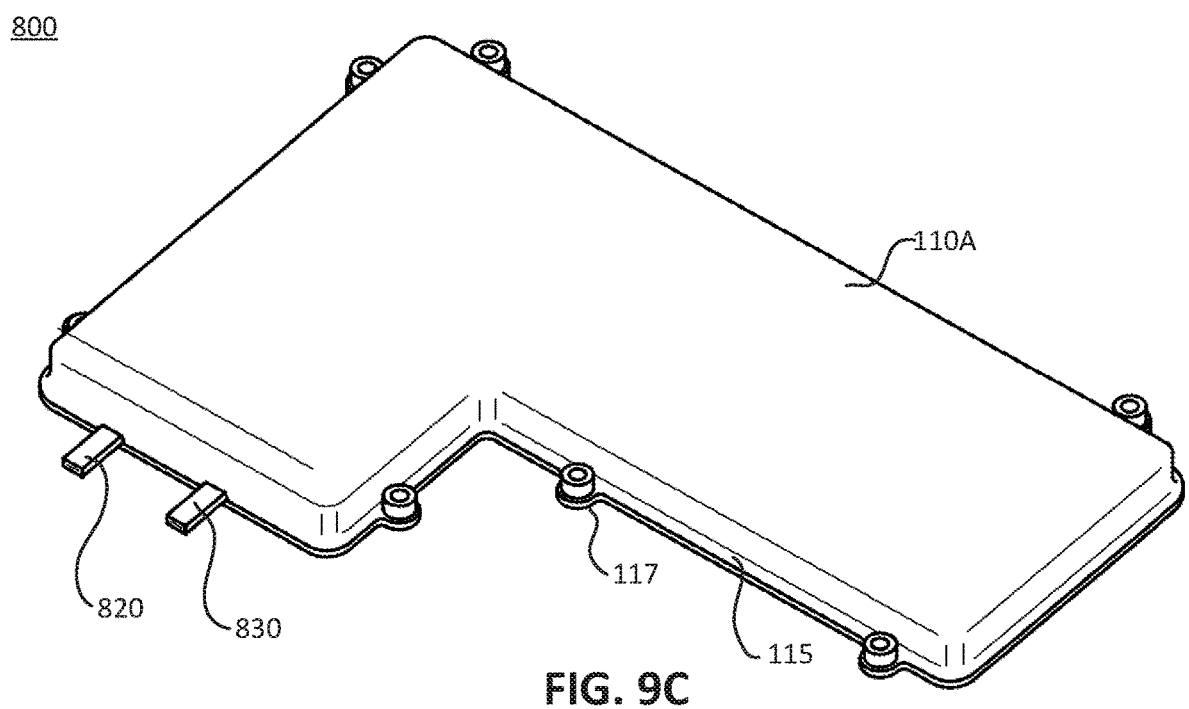
FIG. 9C illustrates a perspective view of an assembled battery, in accordance with various aspects of the subject technology.

FIGS. 9A-9C illustrate perspective views of assembled batteries, in accordance with various aspects of the subject technology. Referring to FIG. 9A, the battery 100 may comprise an enclosure 110A having a non-rectangular shape. The set of layers 150 or battery cell enclosed within the enclosure may similarly have a non-rectangular shape. As described above, the battery 100 includes the feedthrough 120 and terminal 130 disposed at the terraced portion. The flange 115 of the enclosure 110A may further comprise mounting holes 117 that are configured to receive hardware for affixing or mounting the battery 100 into a portable device. By utilizing hardware to mount the battery 100 via the mounting holes 117, the battery 100 may be easily removed from the portable device without use of adhesive or glue. In some aspects, by utilizing hardware to mount the battery 100 to the portable device, use of mounting adhesives are eliminated thereby allowing the battery 100 to increase in thickness and capacity based on the elimination of an adhesive layer. In another aspect, the mounting holes 117 may be formed using a stamping process after welding of the top portion of the enclosure to the bottom portion of the enclosure.

Referring to FIG. 9B, the battery 400 may comprise an enclosure 110A having a non-rectangular shape. The set of layers 150 or battery cell enclosed within the enclosure may similarly have a non-rectangular shape. As described above, the battery 400 includes the feedthrough 420 and terminal 130 disposed at the terraced portion. The flange 115 of the enclosure 110A may further comprise mounting holes 117 that are configured to receive hardware for affixing or mounting the battery 400 into a portable device.

Referring to FIG. 9C, the battery 800 may comprise an enclosure 110A having a non-rectangular shape. The set of layers 150 or battery cell enclosed within the enclosure may similarly have a non-rectangular shape. As described above, the battery 800 includes the first feedthrough 820 and the second feedthrough 830. The flange 115 of the enclosure 110A may further comprise mounting holes 117 that are configured to receive hardware for affixing or mounting the battery 800 into a portable device.

Figure 10:
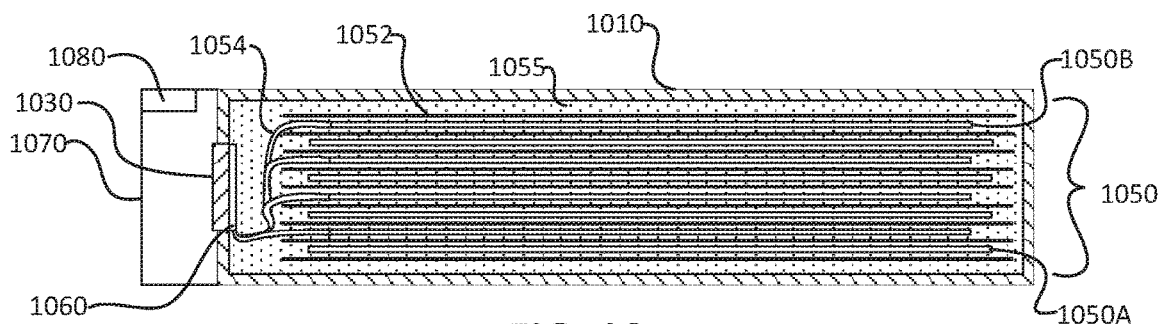
FIG. 10 illustrates a cross-section view of an assembled battery, in accordance with various aspects of the subject technology.

FIG. 10 illustrates a cross-section view of an assembled battery 1000, in accordance with various aspects of the subject technology. The assembled battery 1000 includes a battery cell 1050, enclosure 1010, a battery management unit 1070, and battery terminals 1080. The battery management unit 1070 is configured to manage recharging of the battery cell 1050. The terminals 1080 are configured to engage with corresponding connectors on a portable electronic device to provide power to components of the portable electronic device.

The battery cell 1050 includes a plurality of layers comprising a cathode with an active coating 1050A, a separator 1052, and an anode with an active coating 1050B. For example, the cathode 1050A may be an aluminum foil coated with a lithium compound (e.g., $LiCoO_2$) and the anode 1050B may be a copper foil coated with carbon or graphite. The separator 1052 may include polyethylene (PE), polypropylene (PP), and/or a combination of PE and PP, such as PE/PP or PP/PE/PP. The separator 1052 comprises a micro-porous membrane that also provides a "thermal shut down" mechanism. If the battery cell reaches the melting point of these materials, the pores shut down which prevents ion flow through the membrane.

The plurality of layers may be wound to form a jelly roll structure or can be stacked to form a stacked-cell structure. The plurality of layers are enclosed within enclosure 1010 and immersed in an electrolyte 1055, which for example, can be a LiPF6-based electrolyte that can include Ethylene Carbonate (EC), Polypropylene Carbonate (PC), Ethyl Methyl Carbonate (EMC) or DiMethyl Carbonate (DMC). The electrolyte can also include additives such as Vinyl carbonate (VC) or Polyethylene Soltone (PS). The electrolyte can additionally be in the form of a solution or a gel.

The cathode layers 1050A of the plurality of layers are coupled to a tab (not shown) through intermediate tabs (not shown) extending from one or more cathode layers 1050A. The anode layers 1050B of the plurality of layers are coupled to a tab 1060 through intermediate tabs 1054 extending from one or more anode layers 1050B. The tabs extending from the battery cell 1050 provide for electrical connections to other battery cells, the battery management unit 1070, or other components as desired. As discussed above, the tab 1060 may be electrically coupled to the enclosure 1010 at the terminal 1030. As also discussed above, the tab extending from the cathode layers may be electrically coupled to the cathode feedthrough (e.g., feedthroughs 120, 420, 820).

Figure 11:
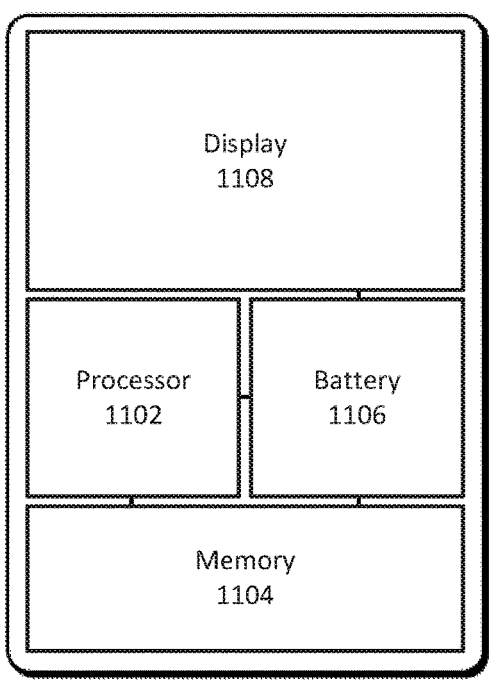
FIG. 11 illustrates a portable electronic device, in accordance with various aspects of the subject technology.

FIG. 11 illustrates a portable electronic device 1100, in accordance with various aspects of the subject technology. The above-described rechargeable battery 100, 400, 800, 1000 can generally be used in any type of electronic device. For example, FIG. 11 illustrates a portable electronic device 1100 which includes a processor 1102, a memory 1104 and a display 1108, which are all powered by the battery 1106 (e.g., battery 100, 400, 800, 1000). Portable electronic device 1100 may correspond to a laptop computer, tablet computer, mobile phone, personal digital assistant (PDA), digital music player, watch, and wearable device, and/or other type of battery-powered electronic device. Battery 1106 may correspond to a battery pack that includes one or more battery cells. Each battery cell may include a set of layers sealed in an enclosure, including a cathode with an active coating, a separator, an anode with an active coating, and utilize the electrical feedthroughs described above (e.g., feedthroughs 120, 420, 820, 830).

Figure 12:
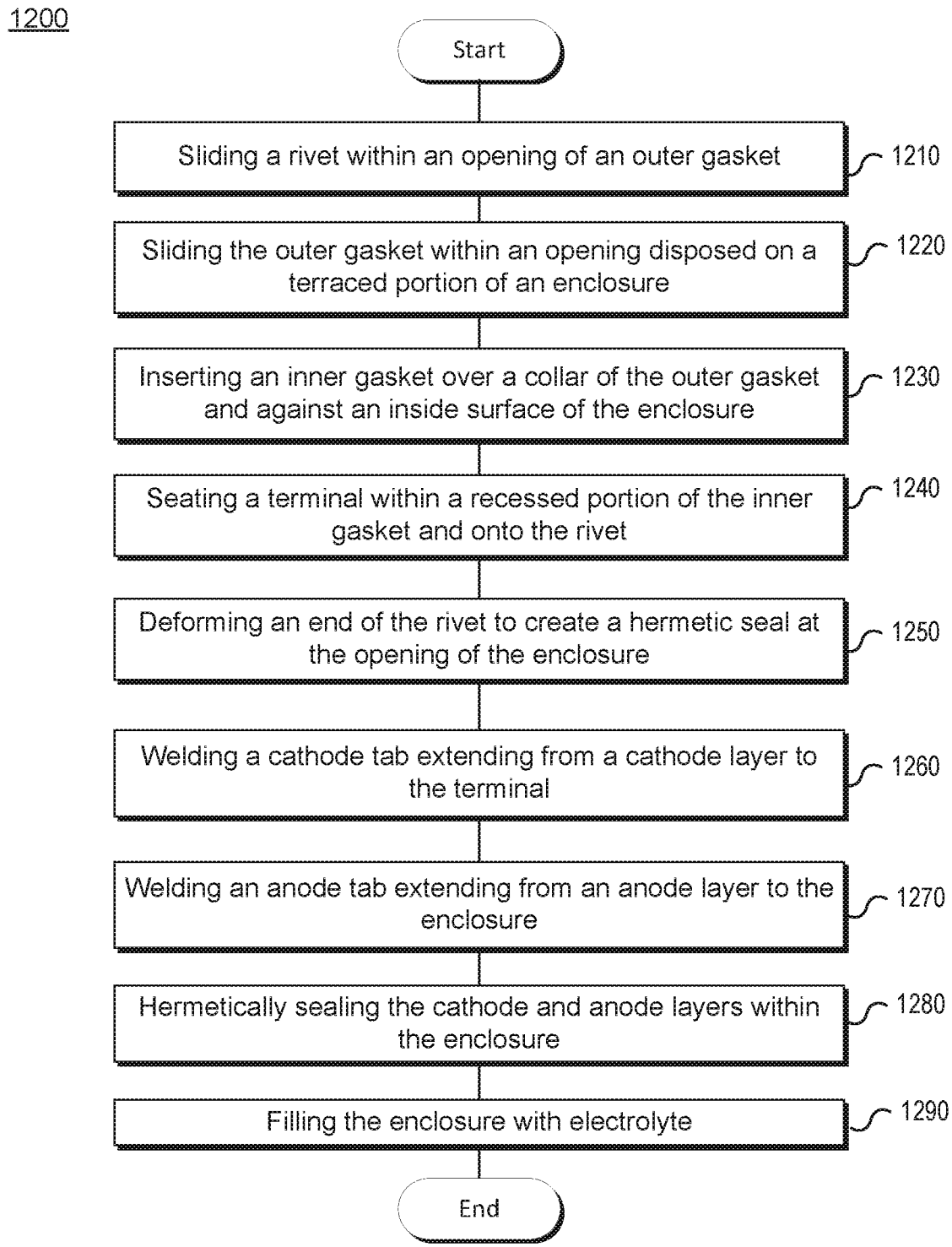
FIG. 12 illustrates an example method for manufacturing a battery cell, in accordance with various aspects of the subject technology.

FIG. 12 illustrates an example method 1200 for manufacturing a battery cell, in accordance with various aspects of the subject technology. It should be understood that, for any process discussed herein, there can be additional, fewer, or alternative steps performed in similar or alternative orders, or in parallel, within the scope of the various embodiments unless otherwise stated.

At operation 1210, a rivet is slid within an opening of an outer gasket. At operation 1220, the outer gasket is slid within an opening disposed on a terraced portion of an enclosure. As described above, the terraced portion has a reduced thickness with respect to a thickness of another portion of the enclosure. The enclosure is configured to protect a set of layers that comprise a battery cell. The set of layers includes a cathode layer, an anode layer, and a separator layer disposed between the cathode layer and the anode layer. At operation 1230, an inner gasket is inserted over a collar of the outer gasket and against an inside surface of the enclosure. As described above, the inner gasket includes a recessed portion for receiving a terminal.

At operation 1240, the terminal is seated within the recessed portion of the inner gasket and onto the rivet. At operation 1250, an end of the rivet is deformed to create a hermetic seal at the opening of the enclosure. In one aspect, to create a hermetic seal at the opening, a compressive force between a head of the rivet and the deformed end of the rivet is generated against the outer gasket, the wall of the enclosure, the inner gasket, and the terminal.

At operation 1260, a cathode tab extending from the cathode layer is welded to the terminal. At operation 1270 an anode tab extending from the anode layer is welded to the enclosure. At operation 1280, the set of layers are hermetically sealed within the enclosure. At operation 1290, the enclosure is filled with electrolyte.

Figure 13:
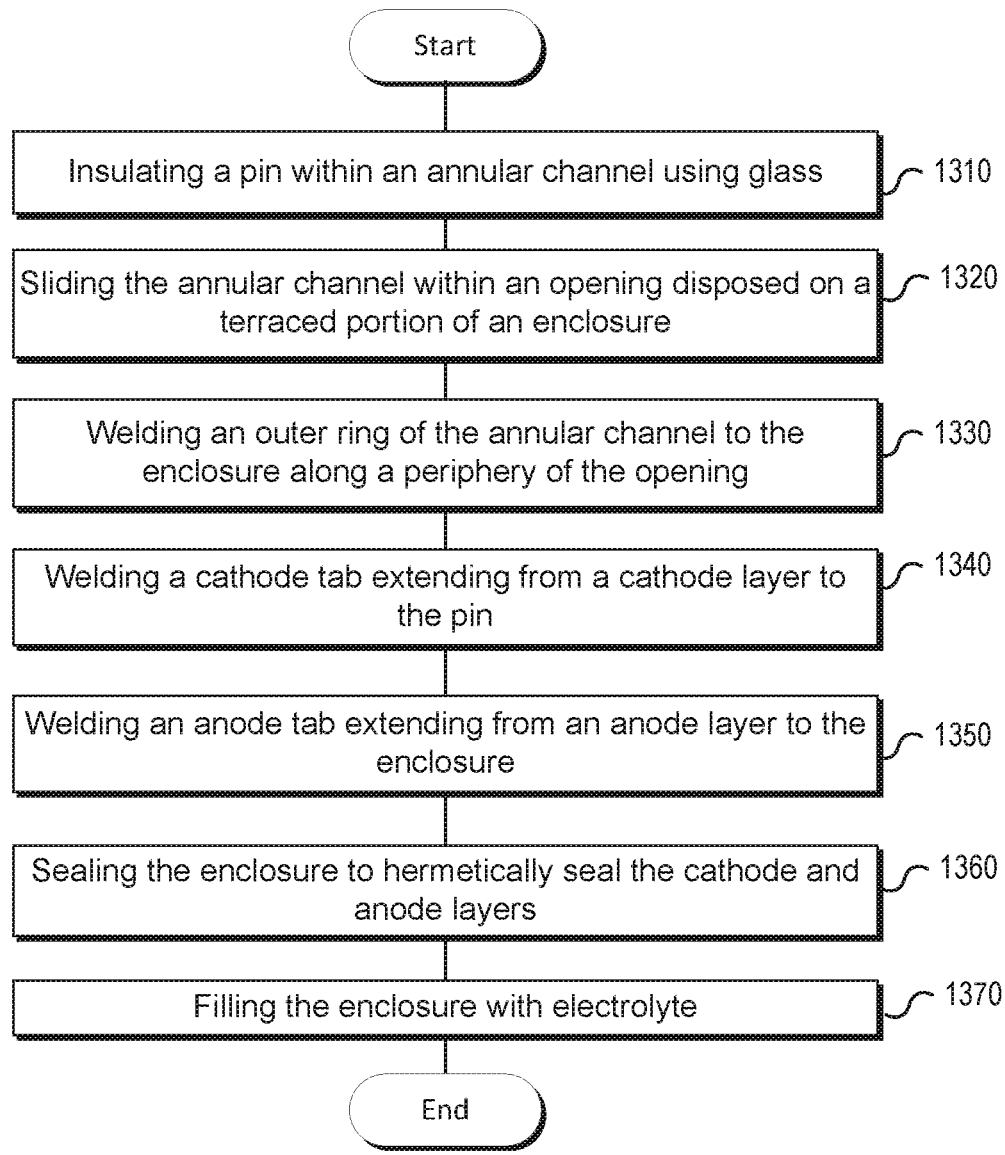
FIG. 13 illustrates an example method for manufacturing a battery cell, in accordance with various aspects of the subject technology.

FIG. 13 illustrates an example method 1300 for manufacturing a battery cell, in accordance with various aspects of the subject technology. It should be understood that, for any process discussed herein, there can be additional, fewer, or alternative steps performed in similar or alternative orders, or in parallel, within the scope of the various embodiments unless otherwise stated.

At operation 1310, a pin is insulated within an annular channel using glass or a ceramic. The pin is configured to conduct electrical energy from a battery cell enclosed within an enclosure to a portable device. At operation 1320, the annular channel is slid within an opening disposed on a terraced portion of an enclosure. As described above, the terraced portion has a reduced thickness with respect to a thickness of another portion of the enclosure. The enclosure is configured to protect the battery cell. The battery cell includes a cathode layer, an anode layer, and a separator layer disposed between the cathode layer and the anode layer. At operation 1330, an outer ring of the annular channel is welded to enclosure along a periphery of the opening.

At operation 1340, a cathode tab extending from a cathode layer of the battery cell is welded to the pin. At operation 1350 an anode tab extending from an anode layer of the battery cell is welded to the enclosure. At operation 1360, the enclosure is hermetically sealed to seal the battery cell within the enclosure. At operation 1370, the enclosure is filled with electrolyte Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method for manufacturing a battery cell, the method comprising:
    placing a pin within an annular channel, the annular channel comprising an outer ring and an inner sidewall;
    forming an insulator between the pin and inner sidewall of the annular channel using glass, wherein the pin extends through the insulator;
    sliding the annular channel within an opening disposed on a terraced portion of an enclosure, the terraced portion having a reduced thickness with respect to a thickness of another portion of the enclosure, the enclosure configured to enclose a set of layers, the set of layers comprising a cathode layer, an anode layer, and a separator layer disposed between the cathode layer and the anode layer;
    welding the outer ring of the annular channel to the enclosure along a periphery of the opening to create a hermetic seal;
    welding a cathode tab extending from the cathode layer to the pin;
    welding an anode tab extending from the anode layer to the enclosure;
    hermetically sealing the set of layers within the enclosure; and
    filling the enclosure with electrolyte.

2. The method of claim 1, further comprising disposing a second insulator on an inner surface of the enclosure and proximate to the cathode tab to prevent electrical contact between the cathode tab and the enclosure.

3. The method of claim 1, wherein insulating the pin within the annular channel further comprises bonding the glass to a base of the annular channel, the glass further comprising an overmold portion that extends between the base of the annular channel and the cathode tab, the overmold portion configured to prevent electrical contact between the cathode tab and the annular channel.

4. The method of claim 1, further comprising disposing a dielectric spacer between a base of the annular channel and the cathode tab, the dielectric spacer configured to prevent electrical contact between the cathode tab and the annular channel.

5. The method of claim 1, wherein the enclosure has a thickness less than 3 mm.

6. The method of claim 1, wherein the enclosure has a non-rectangular shape.

7. The method of claim 1, wherein the enclosure further comprises a flange extending along a periphery of the enclosure, wherein the flange comprises a lip extending from the flange, the lip configured to stiffen the enclosure.

8. The method of claim 1, wherein the enclosure further comprises a flange extending along a periphery of the enclosure, wherein the flange comprises mounting holes.

* * * * *